United States Patent
Yang

[11] Patent Number: 5,282,246
[45] Date of Patent: Jan. 25, 1994

[54] HANDSFREE MOBILE TELEPHONE RACK

[76] Inventor: Chao-Ming Yang, No. 20, Lane 2, Kuang Wu Street, Pan Chiao, Taipei Hsien, Taiwan

[21] Appl. No.: 789,264

[22] Filed: Nov. 8, 1991

[51] Int. Cl.$^5$ .................. H04M 1/00; H04M 9/00
[52] U.S. Cl. .................. 379/455; 379/432; 379/446; 379/450; 379/459
[58] Field of Search .......... 379/58, 59, 420, 432, 379/446, 447, 450, 456, 455; 455/89, 90

[56] References Cited

U.S. PATENT DOCUMENTS

| | | | |
|---|---|---|---|
| 4,025,728 | 6/1977 | Jacobson | 379/420 |
| 4,293,740 | 10/1981 | Gibb et al. | 379/388 |
| 5,040,712 | 8/1991 | Pesonen et al. | 379/454 |
| 5,060,260 | 10/1991 | O'Connell | 379/454 |
| 5,121,863 | 6/1992 | Kotitalo et al. | 379/446 |

Primary Examiner—Curtis Kuntz
Assistant Examiner—Vijay Shankar
Attorney, Agent, or Firm—Jacobson, Price, Holman & Stern

[57] ABSTRACT

A handsfree mobile telephone rack for holding any of a variety of mobile telephones permitting a user to send a message by a mobile telephone with both hands free, comprising a power socket connected to a power supply by a power cord, a power switch, a volume control, and two loudspeaker circuits, wherein the two loudspeaker circuits each comprised a microphone and a loudspeaker with the output volume thereof regulated by the volume control; the two loudspeaker circuits include one for transmitting the sound waves from a user to the mouthpiece of the mobile telephone mounted thereon and the other for transmitting the sound waves from the receiver of the mobile telephone into the air.

4 Claims, 2 Drawing Sheets

HANDSFREE MOBILE TELEPHONE RACK

BACKGROUND OF THE INVENTION

The present invention relates to telephone racks and relates more particularly to a hands-free mobile telephone rack for holding a mobile telephone permitting a car driver to send a message by a mobile telephone without holding it in the hand.

The mobile telephone is convenient in use outdoors. However, a mobile telephone must be held in one's hand during operation. Therefore, it is very dangerous to send a message by a mobile telephone while driving a car. It has been legislated in many countries that a car driver is prohibited from holding a mobile telephone in the hand for sending a message while driving. In order to meet this regulation, various hands-free mobile telephone racks have been disclosed for holding a mobile telephone so that a car driver can send a message hands-free by a mobile telephone. However, the known hands-free mobile telephone racks are still not satisfactory in use. Because a mobile telephone is generally connected to a mobile telephone rack by a telephone cord, it is difficult to carry a mobile telephone away from a car. Further, a mobile telephone rack is generally designed for a specific mobile telephone from a specific manufacturer, i.e., a mobile telephone rack can not be used to match with all models of mobile telephones.

SUMMARY OF THE INVENTION

The present invention has been designed to overcome the aforementioned problems. It is therefore an object of the present invention to provide a mobile telephone rack for holding a mobile telephone which permits a user to send a message by a mobile telephone without holding a mobile telephone in the hand. It is another object of the present invention to provide a mobile telephone rack which is suitable for holding any of a variety of mobile telephones. It is still another object of the present invention to provide a mobile telephone rack into which a mobile telephone can be directly inserted to form a mobile speakerphone without the use of any connecting wires.

According to the present invention, there is provided a hands-free mobile telephone rack which has means to automatically adjust the receiving chamber therein according to the size of the mobile telephone inserted therein. The hands-free mobile telephone rack comprises a power socket connected to a power supply by a power cord, a power switch for power control, a first loudspeaker circuit for transmitting the sound waves from a user to the mouthpiece of the mobile telephone mounted thereon, a second loudspeaker circuit for transmitting the sound waves from the receiver of the mobile telephone into the air, and a volume control for regulating the output volume of said first and second loudspeaker circuits. Once a mobile telephone is inserted in the hands-free mobile telephone rack, a user can send a message by the mobile telephone without hand holding it.

DETAILED DESCRIPTION OF THE PREFERRED EMBODIMENT

Figure 1:
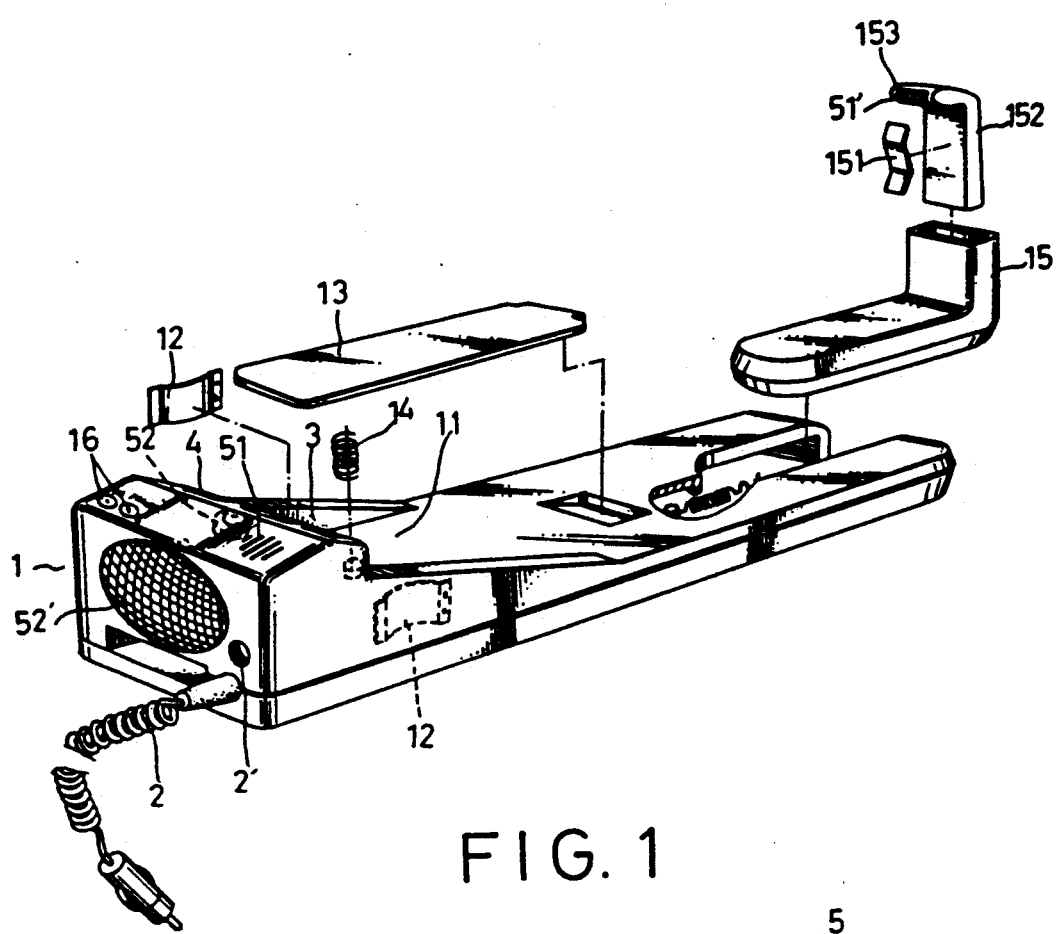
FIG. 1 is an exploded perspective view of the preferred embodiment of the hands-free mobile telephone rack of the present invention.

Referring to FIG. 1, a mobile telephone rack as constructed in accordance with the present invention is generally comprised of a rack 1 having a power socket 2' for connecting to a power supply by a power cord 2, a power switch 3, a volume control 4, and two built-in loudspeaker circuits 5, wherein each loudspeaker circuit 5 is comprised of a microphone 51 or 51' and a loudspeaker 52 or 52'; volume output is adjusted through the volume control 4.

Figure 2:
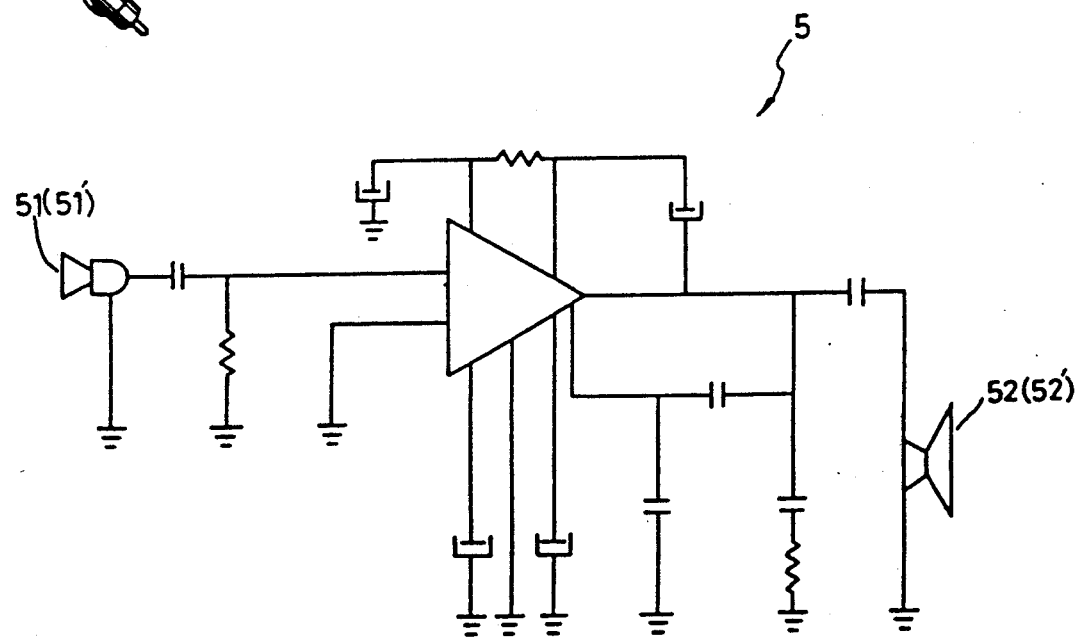
FIG. 2 is a circuit diagram according to the present invention.
Figure 3:
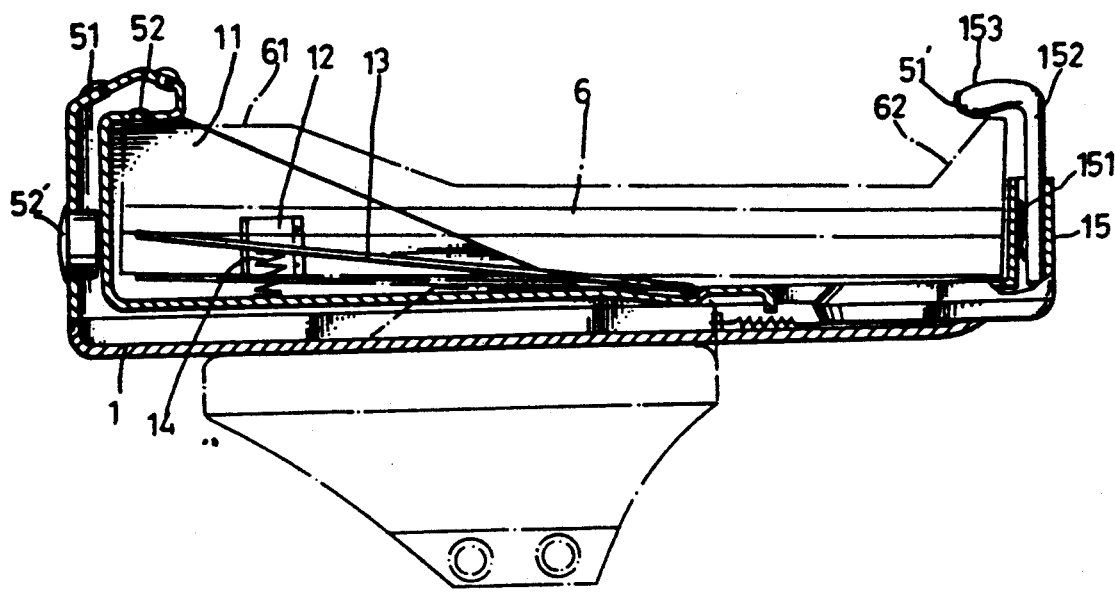
FIG. 3 is a sectional assembly view of the preferred embodiment of the hands-free mobile telephone rack of the present invention.
Figure 4:
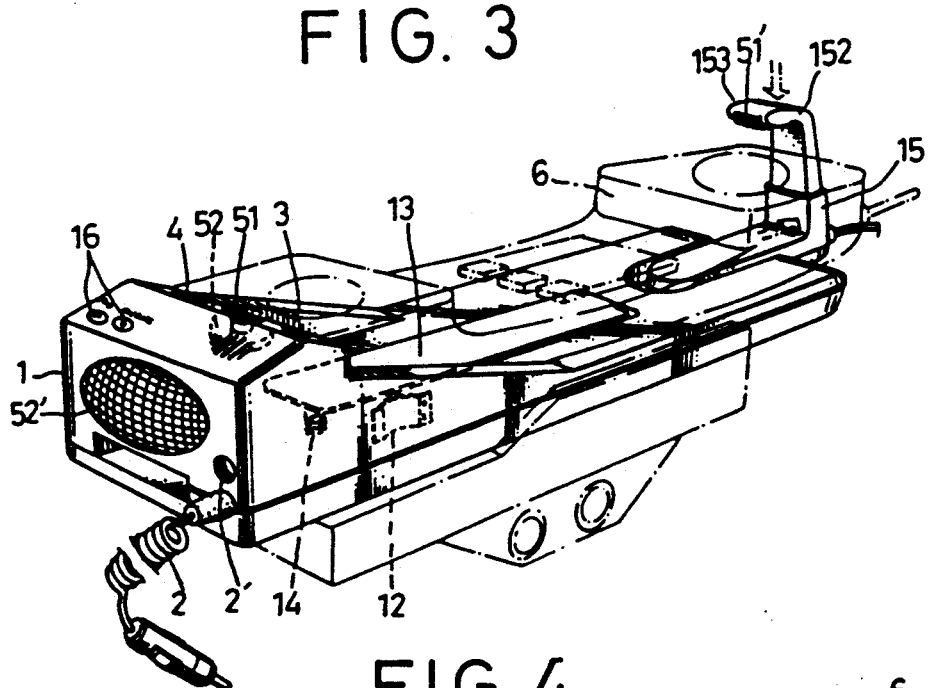
FIG. 4 is a perspective assembly view of the preferred embodiment of the hands-free mobile telephone rack of the present invention.

Referring to FIGS. 2, 3 and 4 with continued reference to FIG. 1, the microphone 51 of a first loudspeaker circuit is mounted on the rack 1 at the outside (at a location adjacent to user's position), the loudspeaker 52 of the first loudspeaker circuit is fastened inside a receiving chamber 11 defined in the rack 1 into which a mobile telephone 6 is inserted. When a mobile telephone 6 is inserted into the receiving chamber 11 in the rack 1, the mouthpiece 61 of the mobile telephone 6 is disposed against the loudspeaker 52. The microphone 51' of a second loudspeaker circuit is fastened in the rack 1 and disposed at a location adjacent to the receiver 62 of the mobile telephone, the loudspeaker 52' of the second loudspeaker circuit is mounted on the rack 1 at the outside toward the user. By means of the arrangement of the two loudspeaker circuits 5, a mobile telephone can be placed in the rack 1 and incorporated therewith into a hands-free mobile speakerphone. Therefore, a user can send a message by the hands-free mobile speakerphone without holding it in the hand and, the mobile telephone can be conveniently carried away from the rack.

Figure 5:
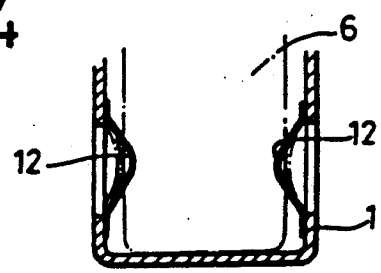
FIG. 5 is a schematic plan view showing the adjustment of the width of the receiving chamber.

Referring to FIG. 5 and seeing FIGS. 1 and 3 again, the rack has two curved spring plates 12 fastened inside the receiving chamber 11 thereof at two opposite sides, and a supporting board 13 supported on the receiving chamber 11 at the bottom by a spring 14. Therefore, the width and height of the receiving chamber 11 can be automatically adjusted according to the size of the mobile telephone inserted therein. The rack 1 further comprises a rack end extension 15 at one end opposite to the receiving chamber 11. The rack end extension 15 has a hooked member 152 fastened therein at the top at a right angle by a spring leaf 151. Because of the arrangement of the spring leaf 151, the hooked member 152 can be oscillated on the rack end extension 15. The microphone 51' of the second loudspeaker circuit may be fastened in the nose 153 of the hooked member 152. Therefore, when a mobile telephone is inserted in the rack 1 with one end held in the receiving chamber 11, the opposite end of the mobile telephone is retained by the hooked member 152 and, the microphone 51' is automatically disposed adjacent to the receiver 62 of the mobile telephone. Further, an earphone jack 16 may be made on the rack 1 for connecting an earphone.

As indicated, the present invention is to provide such a hands-free mobile telephone rack for holding a mobile telephone which permits a user to send a message by a mobile telephone without holding it in the hand, and therefore, the user has both hands free for steering control.

What is claimed is:

1. A mobile telephone rack for holding different models of mobile telephones each having a receiver and a mouthpiece, the telephone rack comprising a power socket connected to a power supply by a power cord, a power switch connected in a circuit arrangement with said power socket, a volume control, and first and second loudspeaker circuits each of said loudspeaker circuits connected to said power switch to receive power from said power supply in response to activation of said power switch and connected to said volume control, each of said first and second loudspeaker circuits comprising a microphone and a loudspeaker connected to the microphone for emitting sound detected by the associated microphone, the microphone of the first loudspeaker circuit detecting sound from a user and in response the loudspeaker of the first loudspeaker circuit emitting the sound to the mouthpiece of the mobile telephone mounted in said rack, and the microphone of the second loudspeaker circuit detecting sound from the receiver of the mobile telephone and in response the loudspeaker of the second loudspeaker circuit emitting the sound from the receiver to be heard by the user.

2. The mobile telephone rack according to claim 1, which defines therein a receiving chamber for inserting a mobile telephone, said receiving chamber having two curved spring plates disposed at two opposite sides and a supporting board supported by a spring at the bottom for supporting the mobile telephone inserted therein.

3. The mobile telephone rack according to claim 1, which further comprises an end extension at one end opposite to a receiving chamber, said end extension having a hooked member fastened therein at the top at a right angle by a spring leaf for holding the opposite end of the mobile telephone which is inserted in said receiving chamber, said hooked member having a nose into which the microphone of said second loudspeaker circuit is installed to pick up the sound waves transmitted through the receiver of the mobile telephone.

4. The mobile telephone rack of claim 1, and further comprising mounting means for mounting a mobile telephone therein so that the mouthpiece of the mobile telephone is positioned adjacent the loudspeaker of the first loudspeaker circuit and the receiver of the mobile telephone being positioned adjacent the microphone of the second loudspeaker circuit, the loudspeaker of the second loudspeaker circuit being positioned on said rack facing towards a user.

* * * * *